March 23, 1965     G. WALDES ETAL     3,175,028
SLIDE FASTENER MANUFACTURE
Filed Oct. 27, 1960     2 Sheets-Sheet 1
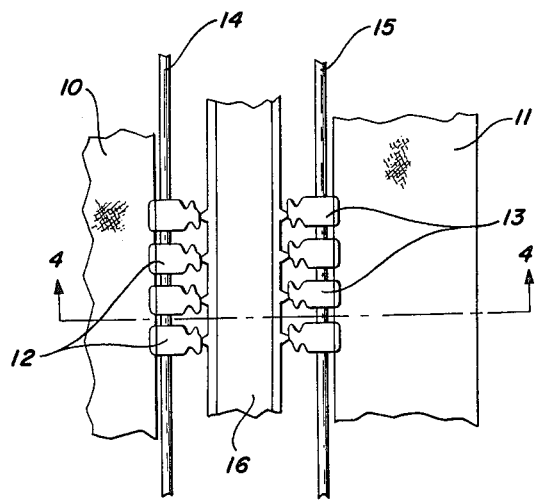
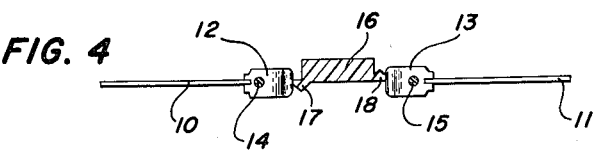
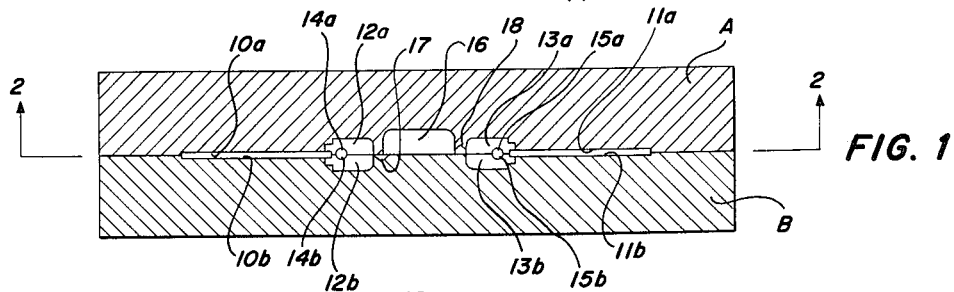
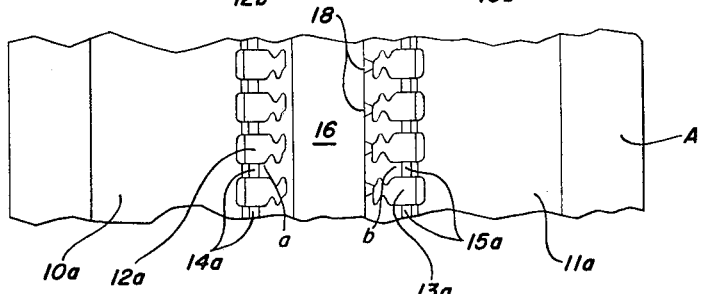
INVENTOR
GEORGE WALDES
and IGNACIO M. MARCUSSON
BY
ATTORNEY March 23, 1965  G. WALDES ETAL  3,175,028
SLIDE FASTENER MANUFACTURE
Filed Oct. 27, 1960  2 Sheets-Sheet 2

INVENTOR
GEORGE WALDES
and IGNACIO M. MARCUSSON
BY
ATTORNEY

United States Patent Office 3,175,028
Patented Mar. 23, 1965

3,175,028
SLIDE FASTENER MANUFACTURE
George Waldes, Plandome, Manhasset, and Ignacio M. Marcusson, Lake Success, N.Y., assignors to Waldes Kohinoor Inc., Long Island City, N.Y., a corporation of New York
Filed Oct. 27, 1960, Ser. No. 65,478
4 Claims. (Cl. 264—252)

This invention relates to improvements in slide fastener manufacture, and more particularly to an improved method of making plastic slide fasteners.

It is of course well known to fashion the oppositely arranged stringers of plastic slide fasteners, i.e. usually tapes with beads or cords affixed to the adjacent edges thereof and carrying rows of plastic interlocking fastener elements, by arranging the tapes in spaced side-by-side relationship in a suitable mold and thereupon forming and attaching the rows of plastic elements by injection-molding same directly on the beaded edge portions of the tapes. However, this generally employed practice of making plastic slide fastener components is not entirely satisfactory because the hold or grip which the hardened plastic elements exert on the beaded edge portions of the tapes is lower than desirable, due apparently to the fact that the plastic material of the fastener elements does not completely enclose the tape beads since it cannot reach those portions of the peripheries of the beads that bear directly against the faces of the tapes on which they are superimposed. Thus, when a heavy side pull is exerted on the stringers whose plastic interlocking elements are formed and attached in the usual manner, for example, when attempt is made to open the fastener by forcibly stripping the stringers apart without resort to the slider, one or more of the elements are likely to be torn from its tape bead, whereupon the fastener as a whole can become inoperable or, at best, its smooth operation may be seriously impaired.

Stated broadly, it is a major object of the invention to provide a method or practice of so forming the stringers of so-called plastic slide fasteners that the holding power which the plastic fastener elements exert on their tape bead or beads is increased to the extent as to make it practically impossible to tear off any one of the fastener elements from the bead or beads to which they are attached short of tearing the tape itself; or, stated otherwise, of so increasing the holding power of the plastic elements that it exceeds the tear strength of the material making up the stringer tapes and/or beads.

More particularly, an object of the invention is the provision of a method of forming plastic-fastener stringers by the practice of which the plastic material of the elements is caused to completely enclose and does in fact so enclose the tape bead or beads to which they attach throughout the full circumference thereof without, however, impairing the flexibility of the stringer inasmuch as the spaces between the plastic elements remain free of the plastic material as heretofore.

Still another object of the invention is the provision of a practical and thoroughly dependable method of forming the stringers of plastic slide fasteners, according to which a tape bead to which the plastic elements are to be attached by molding same directly thereto is initially slightly spaced from the edge of its tape, rather than being laid flat against a tape face along its element-carrying edge as heretofore, with the result that the plastic fastener elements formed thereon extend all around the bead and over onto the upper and under faces of the adjacent edge of the tape, with the desirable result that the holding power of the plastic elements is substantially increased as compared to that of plastic fastener elements attached to the beaded edge of a tape in conventional manner.

The invention further contemplates a procedure of increasing the holding power and intimacy of the connection between the plastic fastener elements and beaded tapes of plastic slide-fastener stringers over and above that attained by molding the plastic fastener elements completely around the tape as aforesaid, by sewing the tape beads to the edges of the tapes proper in the intervals between the plastic fastener elements formed thereon. In this operation, the bead or cord portions extending between the plastic fastener elements are preferably drawn tight against the edge of the tape to which the bead and fastener elements are attached, thereby enhancing the security and intimacy of the connection.

In other aspects, the invention contemplates and seeks to provide a method for making a novel plastic slide-fastener stringer comprising a tape having an edge bead or cord and a row of plastic interlocking fastener elements carried thereby, wherein the plastic fastener elements extend completely around the tape rather than only partly around same as heretofore, and wherein the elements themselves act in whole or in part to secure the bead to the tape edge by extending past the bead and thence over onto the upper and under faces of the tape edge-portion.

Another object of the invention is the provision of a method for making an improved stringer construction for plastic slide fasteners characterized by a tape, an edge bead spaced a small distance from the relatively inner edge of the tape, and plastic fastener elements molded directly onto the bead and tape edge in such a way as to make an intimate, secure connection between said elements and tape, in conjunction with thread or stitch connections between the bead and tape edge in the intervals of the latter between the plastic fastener elements, which further enhances the security and intimacy of the aforesaid element-to-tape connection.

A still further object of the invention is the provision of a method for making a stringer for plastic slide fasteners constructed and stitch-reinforced as last above, wherein the plastic fastener elements are so formed along their ends which extend over the tape edge as to protect the reinforcing stitches from being worn or scuffed by contact of the side flanges of the fastener slider therewith.

The above and other objects and features of advantage of the improved method and product and/or intermediate product thereof according to the invention will appear from the following detailed description, in which reference is made to the accompanying drawings wherein:

FIG. 1 is a transverse section taken through a two-part mold designed for the making of the stringers of a plastic slide fastener according to the invention;

FIG. 2 is a fragmentary section taken on line 2—2 of FIG. 1 as provides in effect an inner face or plan view of a portion of the upper half of the mold of FIG. 1;

FIG. 3 is a fragmentary plan view showing the companion stringers for a plastic slide fastener made according to the invention immediately after they have been taken out of the mold and while they are still connected by the gate of hardened plastic;

FIG. 4 is a transverse section through the just-formed stringer assembly which is taken on line 4—4 of FIG. 3;

Figure 5:
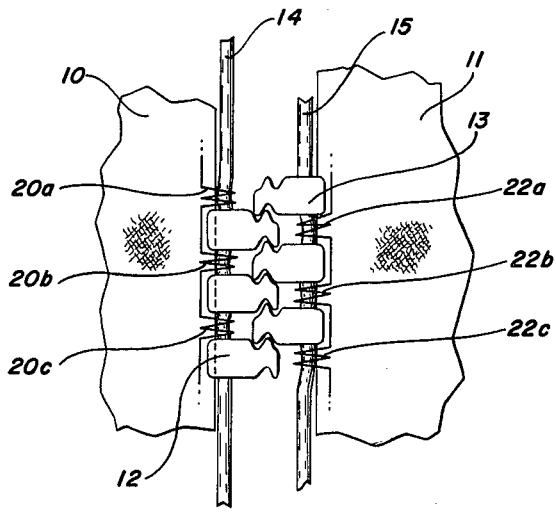
Figure 6:
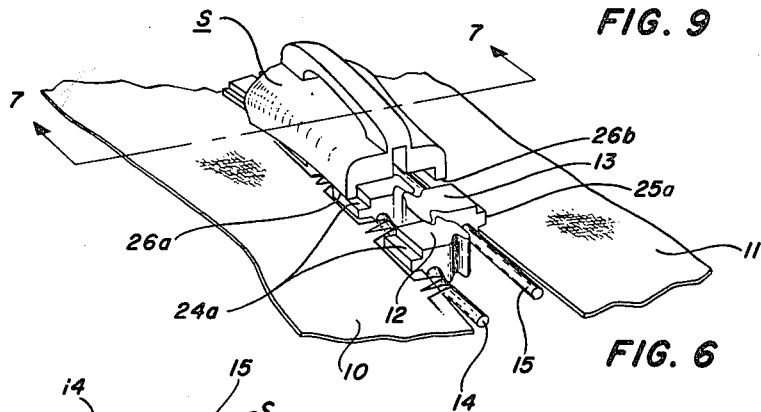
Figure 7:
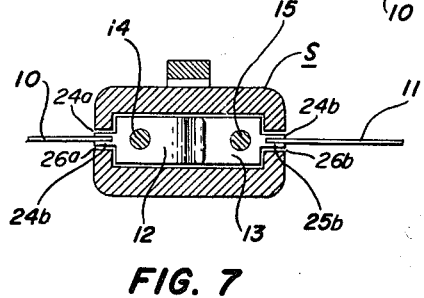

FIG. 5 is a fragmentary plan view of the stringer assembly according to FIG. 3 after removal of the plastic gate and the interlocking of the oppositely disposed fastener elements, and which further illustrates the supplementary stitch means for securing the tape beads or cords about which the plastic fastener elements have been molded to the tape edges in the intervals thereof between said fastener elements;

FIG. 6 is a fragmentary perspective view of a completed plastic slide fastener (with slider assembled thereto) made by the method of the invention;

FIG. 7 is an enlarged section taken on line 7—7 of FIG. 6; and

Figure 8:
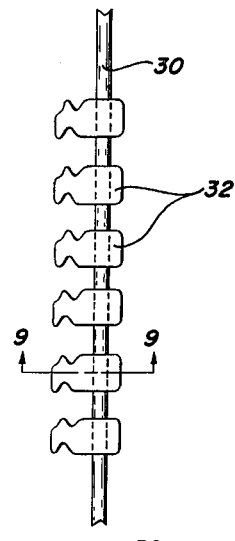
Figure 9:

FIGS. 8 and 9 are plan and sectional views, respectively, of an intermediate or alternate product of the method of the invention, in the form of a unitary plastic-element studded bead or cord designed for later attachment to the tapes of fastener stringers or directly to a garment, for example.

Referring to the drawings in detail and firstly to FIGS. 3 and 4 such illustrate a portion of the companion stringers of a plastic slide fastener produced by the practice of the herein proposed method of slide fastener manufacture, immediately following removal thereof from the mold in which such were formed and also before removal of the plastic gate or runner extending between the stringer components. It will be seen that at this stage of manufacture, the fastener stringer assembly comprises spaced, longitudinally extending, usually fabric tapes 10 and 11 carrying along adjacent longitudinal edges thereof a plurality of oppositely disposed and interlockable plastic fastener elements 12, 13 which are secured at their relatively outer edges to longitudinal beads or cords 14, 15 (hereinafter for convenience referred to simply as "beads") and to the edge portions of the tapes at regularly spaced intervals or pitch distances therealong. At this point it will be observed that, rather than the beads 14, 15 being affixed to their tape edges in overlying (and/or underlying) relationship therewith as is conventional, said beads are instead spaced a small distance inwardly from the inner edges of the tapes, so that in extending over on to the upper and under faces of the tape edges, said plastic fastener elements completely enclosed said beads, just as if the latter were passed through holes provided therefor in the elements.

A mold for forming the stringers of a plastic slide fastener characterized as in the foregoing is shown in FIGS. 1 and 2 and is conventional as respects its being formed in two halves A and B having matching recesses 10a, 10b and 11a, 11b for the reception of the longitudinal tapes 10 and 11 and matching cavities 12a, 12b and 13a, 13b for forming the aforesaid interlocking fastener elements 12, 13, it being noted that the inner edges of the tape recesses in effect cut through the outer sides of the element cavities whereby the plastic material supplied to said cavities will flow over on to the upper and under faces of the tapes received in said tape recesses as is more or less usual. However, said mold departs from the conventional slide fastener stringer-forming mold in that the usual channels or grooves for tape beads disposed in face engagement with the inner edge of tapes received in said recesses 10a, 10b and 11a, 11b are omitted and instead, differently positioned bead grooves 14a, 14b and 15a, 15b are provided, such being spaced relatively inwardly from the inner edges of the tape recesses 10a, 10b and 11a, 11b.

More particularly, said bead grooves 14a, 14b and 15a, 15b are formed in and cut across the relatively raised portions a, b of the mold which extend between and in part define adjacent pairs of the cavities 12a, 12b and 13a, 13b. Thus, when the beads are laid in the matching grooves 14a, 14b and 15a, 15b provided therefor in the mold halves they are not only disposed inwardly from the relatively inner or adjacent edges of the tapes laid in the aforesaid recesses 10a, 10b and 11a, 11b, but also they extend through the element-forming cavities wherein they are supported completely clear and free of the inner walls or surfaces thereof, excepting of course the walls through which they enter and leave the cavities. Accordingly, when plastic material is now injected into the mold (assuming of course that the stringer tapes and beads have been properly placed therein as above and the mold halves closed), such flows along the gate or runner space 16 and thence outwardly through lateral channels or sprues 17, 18 extending to the element-forming cavities 12a, 12b and 13a, 13b. In filling said cavities, the plastic material completely encloses the portions of the beads 14, 15 which extend through said cavities, and since the outer ends of the cavities extend well over and both above and below the inner-edge faces of the tapes positioned in their recesses 10a, 10b and 11a, 11b, the plastic material also flows into the spaces between the beads and their respective tapes and thence over the edge portions of the tapes which extend into the cavities. Thus, when the plastic material injected into the cavities has hardened, an embryo plastic slide-fastener stringer assembly as shown in FIGS. 3 and 4 results, that is, an assembly of stringer tapes, edge beads and plastic fastener elements, wherein the plastic material making up the fastener element extends completely around the tape beads as well as directly over on to the upper and under faces of the stringer tapes.

Following removal of the thus formed slide fastener stringer assembly according to FIGS. 3 and 4 from the separated mold halves A and B, the plastic-material sprues formed by the runner and channel passages 16, 17 and 18, respectively, are removed, whereupon the oppositely disposed fastener elements may be brought into interlocking relationship in which they are shown in FIGS. 5 and 6 as by means of a slider S associated with said stringers in the usual manner.

To supplement the security of the hold or grip which the plastic fastener elements 12, 13 exert on the inner edges of the tapes 10, 11 consequent to being cast directly on and about said edges, the invention provides stitch means operative between the tape beads 14, 15 and their adjacent tape edges in the intervals thereof between adjacent fastener elements 12 and 13. More particularly and as best shown in FIGS. 5 and 6, a line of interrupted stitches 20a, 20b, 20c applied in the intervals between the fastener elements 12 connects the bead 14 to its tape 10, and similarly a line of stitches 22a, 22b, 22c applied in the intervals between the plastic elements thereon secure the bead 15 to its tape 12. Preferably, these stitches are tightened so as to positively draw the bead portions extending between fastener elements into close contact with the tape edge portions through which the stitches pass and thus this bead-to-tape edge stitching at the length portion thereof extending between the fastener elements combines with the hold or grip of the plastic fastener elements themselves on the tape edges as aforesaid to provide a tape bead-and-element connection to tape having an exceptionally high degree of security and intimacy.

In order to protect the aforesaid stitches 20a–20c and 22a–22c from the rubbing or scuffing action of the slider side flanges as might otherwise occur, the relatively outer edges of the oppositely disposed plastic fastener elements are preferably formed as outwardly directed and stepped side flanges 24a, 24b (FIGS. 6 and 7) dimensioned depth-wise and laterally so as to be capable of moving through the side openings 26a, 26b of the slider S by which the fastener is opened and closed in the conventional manner, which openings as is well known are defined by the spaced confronting side flanges of the slider wings. By proper dimensioning and disposition of said outer flanges 24a, 24b they serve as tracks on which the slider side flanges run and thus they space the bead-securing stitches 20a–20c and 22a–22c from said side flanges so that weakening and/or wearing away of said stitches by said side flanges is not possible.

The herein proposed method may also be employed to produce a slide fastener component of the type illustrated in FIGS. 8 and 9 and which comprises a bead or cord 30 studded with a plurality of plastic fastener elements 32 (comparing to one of the aforesaid beads 14, 15 and its plastic elements 12, 13) entirely separate and distinct from the usual fastener-stringer mounting tape. Such element-studded beads, which are adapted to be produced and sold as a unitary article for subsequent sewing to a tape corresponding to a tape 10 or 12, or directly to a garment edge without benefit of tape, may be produced according to the invention in a mold corresponding to that shown in FIGS. 1 and 2 but which is devoid of the tape-receiving recesses 10a, 10b and 11a, 11b thereof. But, regardless of how formed, the plastic material making up the fastener elements 32 is extended completely around the bead 30, just as if, as best shown in FIG. 9, the latter were passed through holes provided therefor in said fastener elements.

Without further analysis, it will be appreciated that the invention provides a novel, practical and thoroughly dependable method of producing the companion stringers of plastic slide fasteners, by which an exceedingly high degree of security and intimacy of connection between the plastic fastener elements, the tape bead or cord and the tape components of the stringers, is achieved. In its article or product aspects, the invention further provides the companion stringer components of a plastic slide fastener characterized by a connection of plastic fastener element to its tape bead and tape of such high strength that it exceeds the tear strength of the tapes and/or beads of the stringers and hence avoids the danger of the plastic fastener elements being torn from tapes, as is so likely to occur when slide fastener stringers made by the prior method are forcibly stripped apart in opening the fastener. The invention further provides a useful intermediate product consisting of a tape or bead mounting a multiplicity of plastic fastener elements thereon which is adapted to be subsequently applied to fastener tapes to make up a conventional fastener chain or directly to a garment opening, for example, without resort to such tapes, whose construction and arrangement is such that the connection of the plastic fastener elements to the bead is rendered highly secure by virtue of the plastic element being cast or molded entirely around said bead.

As many changes could be made in carrying out the above methods and constructions without departing from the scope of the invention, it is intended that all matter contained in the above description or shown in the accompanying drawings shall be interpreted as illustrative and not in a limiting sense.

We claim:

1. A method of making the stringers of plastic slide fasteners comprising the steps of providing a longitudinal stringer tape which is devoid of the cord-like edge bead conventionally carried by stringer tapes along the fastener-element attaching edge, providing a longitudinal fastener-element carrying cord separate from said tape, arranging said tape and said cord in respective positions in which the cord extends along the edge of the tape which is to carry the fastener elements of the stringer but is spaced slightly therefrom, simultaneously molding a plurality of plastic fastener elements to the bead and tape edge in such a way that the plastic material of said elements completely encloses said bead and thence extends over onto the upper and under faces of the tape edge, whereby the fastener elements are positively affixed to said bead and in addition themselves serve to secure the bead to the tape edge, and in a final operation sewing the bead to the edge of the tape in the intervals between said fastener elements, thereby to further secure the bead to the tape edge.

2. A method as defined in claim 1, wherein the stitches by which sewing of the bead to the tape edge is effected are drawn tight, thereby to positively position the bead against the tape edge where sewn thereto.

3. The method of making the stringers of plastic slide fasteners comprising the steps of: providing a longitudinal stringer tape which is devoid of the cord-like edge bead conventionally carried by stringer tapes along their fastener-element attaching edge, providing a longitudinal fastener-element carrying cord separate from said tape, providing a mold having a longitudinal stringer-tape-receiving recess, a plurality of longitudinally spaced fastener element-forming cavities extending laterally from and communicating with the relatively inner-edge portion of said recess, and a cord-receiving groove in the mold wall portions extending between the cavities and spaced inwardly from the inner edge of said recess, arranging said tape and said separate cord in said spaced recess and cord groove, respectively, whereby the cord extends through the cavities and is physically spaced from the adjacent edge of the tape disposed in said tape recess, admitting plastic material under pressure substantially simultaneously to all said cavities, thereby filling the same as results in the plastic material completely enclosing the portions of the bead passing through the cavities and extending over onto the upper and under faces of the tape, and following hardening of the plastic material and removal of the so formed stringer from said mold, sewing the bead to the tape edge in the intervals between the fastener elements resulting from said molding operation.

4. In a method of molding slide fastener elements to a tape and an associated tape bead, the steps of providing a longitudinal stringer tape which is devoid of the cord-like edge bead conventionally carried by stringer tapes along their fastener-element attaching edge, providing a longitudinal fastener-element carrying cord separate from said tape, arranging the bead and at least one edge portion of the tape within a mold in respective positions such that the bead extends along said edge portion but is spaced therefrom, admitting molding material thereto in such manner as to form a plurality of longitudinally spaced, individual fastener elements each enclosing the bead all around and extending as a web across the space between said bead and said tape edge portion and thence over onto both upper and under faces of said tape edge portion, and in a final operation sewing the bead to the tape in the intervals between said so formed fastener elements.

References Cited by the Examiner

UNITED STATES PATENTS

| 2,170,419 | 8/39 | Marinsky | 24—205.16 |
|---|---|---|---|
| 2,287,323 | 6/42 | Poux. | |
| 2,302,912 | 11/42 | Poux. | |
| 2,392,684 | 1/46 | Morin | 264—252 |
| 2,496,925 | 2/50 | Winterhalter | 24—205.16 |
| 2,582,456 | 1/52 | Poux | 24—205.16 |
| 2,735,139 | 2/56 | Morin. | |

FOREIGN PATENTS

| 869,481 | 3/53 | Germany. |
|---|---|---|
| 228,989 | 9/43 | Switzerland. |

ROBERT F. WHITE, *Primary Examiner.*

WILLIAM J. STEPHENSON, MORRIS LIEBMAN, ALEXANDER H. BRODMERKEL, *Examiners.*